Dec. 23, 1969  W. FIENI  3,485,473
AUTOMATIC CONTROL VALVE, IN PARTICULAR FOR MOTOR-CAR
HEATING SYSTEMS
Filed Sept. 8, 1966  4 Sheets-Sheet 1

Walter Fieni, Inventor

United States Patent Office 3,485,473
Patented Dec. 23, 1969

3,485,473
AUTOMATIC CONTROL VALVE, IN PARTICULAR FOR MOTOR-CAR HEATING SYSTEMS
Walter Fieni, Paris, France, assignor to Societe Anonyme Francaise du Ferodo, Paris, France, a company of France
Filed Sept. 8, 1966, Ser. No. 577,905
Claims priority, application France, Sept. 15, 1965, 31,496
Int. Cl. F16k *31/44, 25/00, 7/17*
U.S. Cl. 251—77                 6 Claims

ABSTRACT OF THE DISCLOSURE

Automatic valve device for use in a regulation system to control a fluid flow rate with no risk of surge, comprising a valve seat having a shallow channel formed in its operative surface, a resiliently deformable valve member, an actuating member movable by automatic control means and interconnected to the valve member by spring means, to move the valve member from a fully open position wherein the valve member is substantially spaced from the seat, to a fully closed position wherein the valve member is firmly pressed against the seat by the spring means to close the channel.

---

Figure 1:
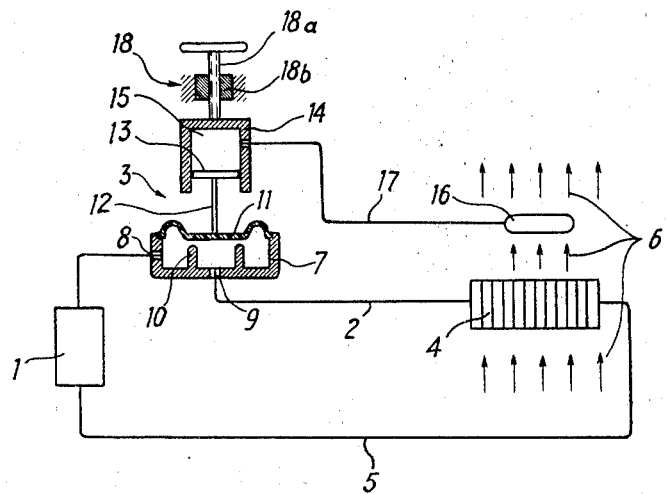

The invention relates to automatic control valves the actuating member of which is operated either by a purely mechanical device or by a hydraulic, pneumatic or electrical device, and it refers more particularly to their application in regulating means, more especially means for regulating the heating of automobiles.

In valves of conventional type, the passage section available to the fluid is comprised between the opposed faces of two co-operating obturation elements whose relative position is linked with the position of the actuating member. When this passage section is relatively large, the displacements of the actuating member bring about moderate variations in the fluid flow rate. On the other hand, upon approaching complete valve shut-off, that is, when the opposed faces of the obturation elements (for example, a valve and its seat or a diaphragm-valve and its seat) are almost in contact, the least movement of the actuating member brings about a considerable variation in the flow rate. This disadvantage in practice makes the employment of such a valve in a regulating mechanism impossible. To obtain accurate regulation, very complicated metering units are employed to adjust flow rates.

Even for relatively rudimentary regulating actions, a proper adjustment of a fluid flow rate can be obtained with a conventional valve only with difficulty. If, for example, use is made of such a valve, controlled by a thermostatic device to adjust the flow rate of the heating fluid which is fed to the heating radiator of an automobile, a minor variation in the temperature of the air leaving this radiator will, when the valve is approaching complete shut-off, bring about too considerable a variation in the flow rate of the heating fluid, from which a surge phenomenon will result.

An object of the present invention is to provide a valve device wherein a uniform movement of the actuating member will bring about, upon approaching complete shutoff, variations in flow rate which are less than or only slightly more than the variations in flow rate it brings about upon approaching the fully open state. To this end, use is made of the shape of the operative surfaces of the obturation elements and of the resiliency of these latter and the actuating member is caused to act upon the relative position of the obturation elements on approaching complete shut-off by means of the interposition of resiliently yieldable means.

It is already known to give to the operative surfaces of the obturation elements (of which one at least is resiliently deformable) shapes such that the said surfaces will not be strictly complementary while at rest, so that between them they afford passage to a very weak liquid flow when they are simply applied without pressure one against the other. According to the invention, between this position and complete shut-off, which is obtained by pressure applied by the yieldably deformable means on the resilient obturation element and deformation thereof, a substantial relative displacement of the obturation elements, brought about by the regulation means, give rise to only a very minor variation in the flow rate and one which does not incur any risk of bringing about surge phenomena.

In an embodiment, the actuating member of the valve, set in motion by the regulation means, acts on the relative position of the obturation elements by the interposition of a cam or an equivalent device which will ensure a very powerful reduction ratio in immediate proximity to complete valve shut-off. In this zone of operation of the valve, the regulating seignals bringing about a considerable displacement of the actuating member produce only an extremely small relative displacement of the obturation elements, from which a very minor variation in flow rate results.

The arrangement according to the invention is preferably combined with series with the regulating control means on the actuating control means on the actuating member.

The following description with reference to the accompanying drawings and given by way of nonlimitative example will bring out the various features of the invention and the art of putting them into effect.

Figure 2:
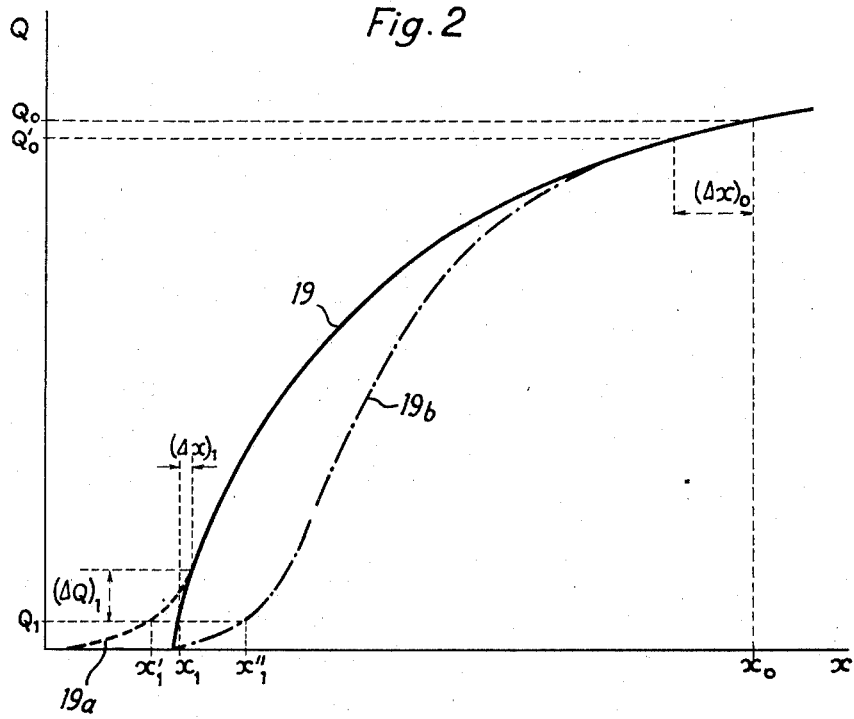
Figure 3:
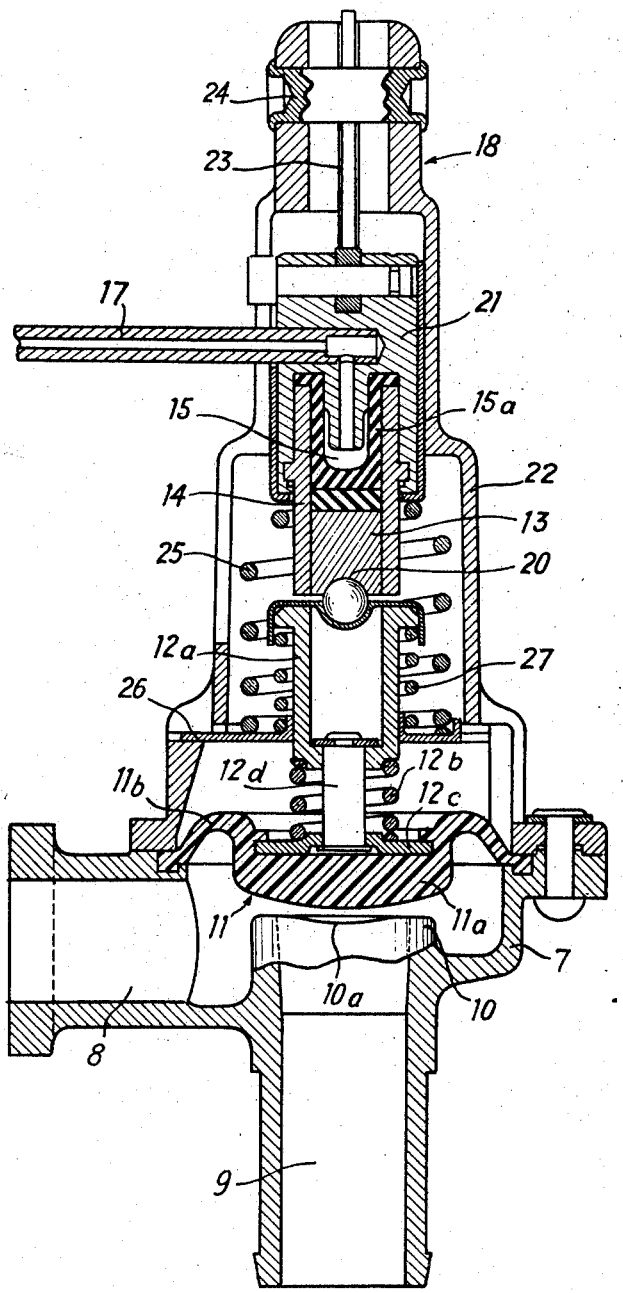
Figure 4:
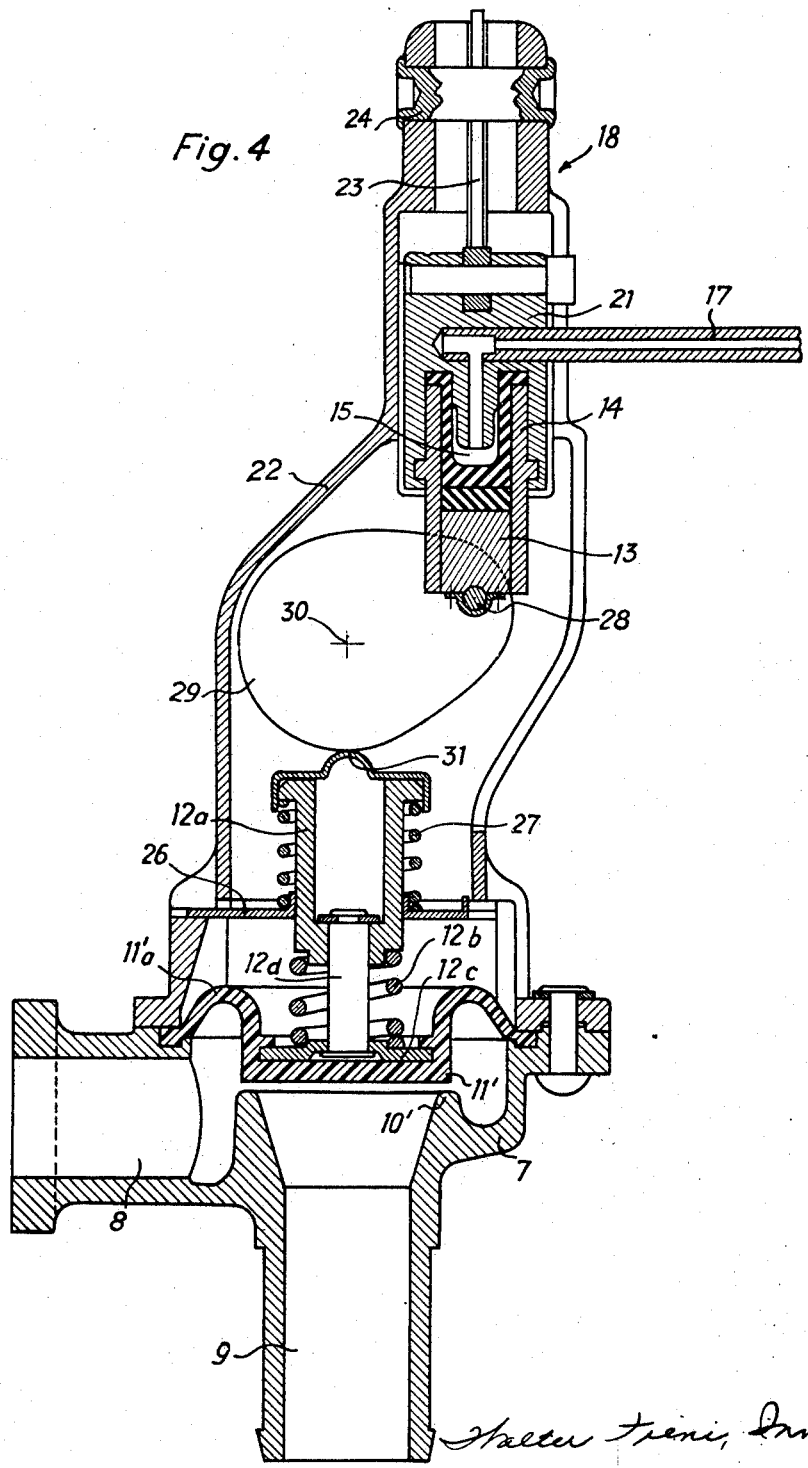
Figure 5:
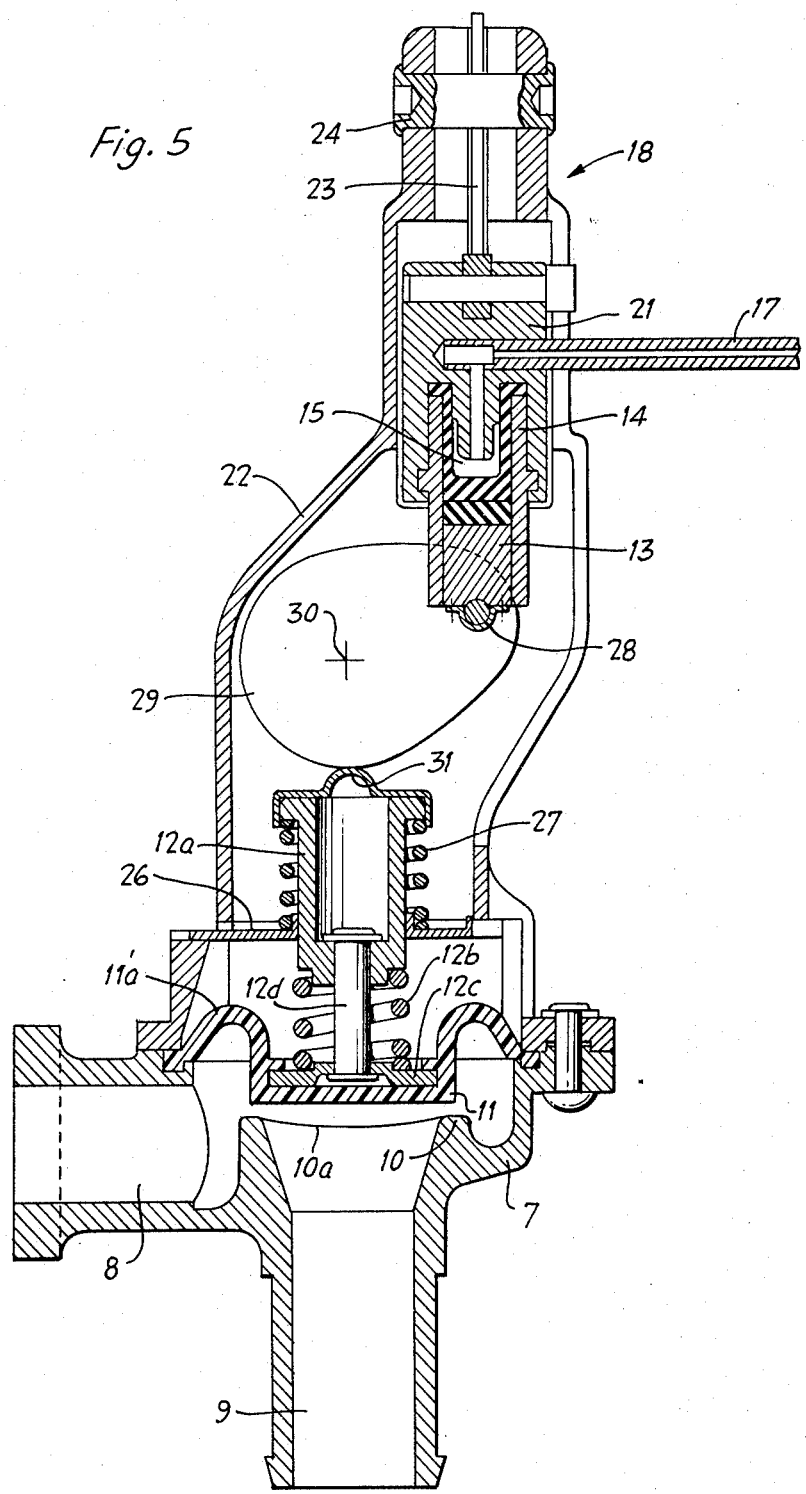

In the drawings:

FIGURE 1 is the diagram of a heating installation for an automobile,

FIGURE 2 is an explanatory graph showing variations in the flow rate of fluid for heating as a function of the lifting of the diaphragm valve of a thermostatic valve, FIGURE 3 illustrates a thermostatic valve according to the invention seen in section, FIGURE 4 is a view analogous to FIGURE 3 and showing another embodiment, and FIGURE 5 is a view analogous to FIGURE 3 and showing another embodiment which combines the valve seat of FIGURE 3 with the features of FIGURE 4.

In the heating device illustrated diagrammatically in FIGURE 1, a fluid for heating, generally hot water, proceeding from a supply source 1, is despatched by way of a pipe 2 and with passage through a thermostatic valve, denoted in its entirety by the reference number 3, into a heating radiator 4, whence it returns to the source 1 by way of a pipe 5; air is blown in the direction of the arrows 6 and heats up as it traverses the radiator 4 before being despatched into the interior of the vehicle. The thermostatic valve 3 comprises, in a known manner, a body 7 in which is contrived a passage for fluid having inlet and outlet parts 8, 9 separated by an obturation device 10, 11 composed of a seat 10 and a diaphragm valve 11. The actuating member for this diaphragm valve is figured diagrammatically by a piston 13 which acts on the diaphragm valve 11 through the agency of a piston rod 12. The piston 13 moves inside a cylinder 14 under the action of an expansible fluid contained in the chamber 15 of this cylinder, a capsule 16 placed in the current of air leaving the radiator 4 and a duct 17 which links these together. This device constitutes the thermostatic control means of the valve 3, which effects regulation of the heating.

At 18 there is diagrammatically illustrated a manually operated calibrating control means, known per se, which makes it possible for the temperature of the air leaving the radiator to be modified at will. According to this diagrammatic illustration, the cylinder 14 is solid with the threaded rod 18a which is screwed into a fixed piece 18b.

The working of such a heating device is well known. In cold weather, the comfort of the passengers in the vehicle requires that the air leaving the radiator 4 should be at a certain temperature, for example 70° C. To obtain this temperature, the heating fluid should be delivered to the radiator 4 at a certain flow rate $Q_0$, for example 500 liters per hour. The thermostatic control means positions the piston 13 in a certain position $x_0$, to which this flow rate $Q_0$ corresponds. If the temperature of the air leaving the radiator 4 varies accidentally, for example as a consequence of a variation in the outside temperature or of the temperature of the heating fluid, the thermostatic control means modifies the position of the piston 13, and consequently the lifting of the diaphragm valve 11, by a small amount $(\Delta x_0)$ determining a new flow rate $Q'_0$ of the heating fluid, which brings the temperature of the air leaving the radiator 4 back to the desired value. This manner of operating is illustrated by FIGURE 2, on which at 19 is traced the diagram representing the value of the flow rate Q, disposed on the Y-axis, as a function of the position $x$ of the piston 13, disposed on abscissae.

In warmer weather or between the seasons, the temperature of the blown air should be less high, for example 40° C., corresponding to a distinctly lesser value $Q_1$ of the flow rate of heating fluid, for example 50 liters per hour or even less. The calibrating control means 18 in a known manner allows of the modifying of the lifting of the diaphragm valve 11 in order to obtain this new operating condition. It will be remarked in FIGURE 2 that the position $x_1$ of the piston 13, corresponding to a small lifting of the diaphragm valve determining the flow rate $Q_1$, is a very small one. In this position of the diaphragm valve, the least displacement $(\Delta x)_1$, either less or more, of the control member 12 (producing the same variation $(\Delta x)_1$, for the lifting of the diaphragm valve brings about a considerable variation $(\Delta Q)_1$ in the flow rate. Consequently, an accidental minor cooling, for example, of the blown air will bring about the operation of the thermostatic device, which will actuate the piston 13 upwards by a minor amount $(\Delta x)_1$, thus increasing the lifting of the diaphragm valve 11 by the same amount. Although this variation in the lifting $(\Delta x)_1$ may be very small, the result will be a relatively considerable increase in the flow rate $(\Delta Q)_1$, which will heat up the blown air beyond the desired temperature; the thermostatic device then operates in the opposite direction, cooling the air to below this temperature, and so on; this is the surge phenomenon, the thermostatic valve operating through alternating impulses without finding a position of equilibrium.

FIGURE 3, in which the elements performing the same function as in FIGURE 1 are denoted by the same reference numbers, illustrates a thermostatic valve according to the invention which allows of a palliation of this disadvantage.

In this valve, a bushing 12a bears, through the interposition of a spring 12b, against a rigid washer 12c imbedded in the diaphragm valve 11, the extension of the spring 12b being limited by a rod 12d which is supported beneath the washer and on the bushing. The thermostatic assembly includes the cylinder 14 and the piston 13 which slides inside the latter under the action of the thermostatic fluid filling the chamber 15, and it bears on the bushing 12a through the interposition of a small ball 20. The fluid of the chamber 15 acts on the piston 13 through the agency of the deformation of a resilient pouch 15a which prevents any leakage of fluid. The cylinder 14 is imbedded in a block 21 sliding inside the hood 22 of the valve body 7 under the action of the calibrating control means, constituted by a cam 23 which is caused to rotate about an axis 24 and against which the block 21 is pressed by a spring 25 bearing against a seat 26. A further spring 27, which likewise bears against this seat 26, urges the bushing 12a upwards.

The diaphargm valve 11 includes a relatively thick body 11a, made from an appropriate elastomer possessing permanent flexibility and resistant to hot water and the glycol employed in anti-freeze mixtures, and a diaphragm 11b which at its periphery is squeezed tightly between the valve body 7 and its hood 22. The seat 10 includes, over a portion of its circumference comprising between ⅓ and ⅕ of the latter, a cresent shaped channel 10a whose depth lies between ⅕ and ⅟₂₀ of the thickness of the rubber body 11a of the diaphragm valve.

The thermostatic valve operates in the manner indicated hereinbefore with regard to FIGURE 1 but, when the calibrating control means 18 and the thermostatic assembly 13, 14 acting in series bring the diaphragm valve body 11a in contact with its seat 10, a weak flow of fluid still passes between the union joints 8 and 9 by way of the channel 10a. When the pressure exerted by the actuating bushing 12a increases, the complete shutting-off of the valve is obtained in a highly progressive manner through the crushing and deformation of the resilient diaphragm valve body 11a, which progressively fills the entirety of the channel 10a.

It should be noted that in the embodiment in FIGURE 3, when for example the piston 13 moves downwards, it presses the bushing 12a against the action of the spring 27 so long as the diaphragm valve body 11a is not in contact with its seat 10, and subsequently against the combined actions of the spring 27, the spring 12b and the resiliency of the diaphragm valve body 11a. In the final phase of this movement, the spring 12b becomes compressed as the diaphragm valve body 11a undergoes deformation, so that a lessening in the passage section and, consequently, in the fluid flow traversing it is still more progressive than if the diaphragm valve body 11a were connected rigidly to the bushing 12a. The spring 12b should be adapted to this particular function it performs in the invention, and in particular its stiffness should be so envisaged, as a function of the resiliency of the diaphragm valve body 11a, as to obtain the law of correspondence that is desired between the displacement of the piston 13 and the variation in flow rate which results from it. The stiffness of the spring 12b should be sufficient to still allow the piston 13 and the bushing 12a to move downward, so compressing the said spring, whereupon the diaphragm valve body is firmly pressed against its seat and entirely blocks the channel 10a.

The curve representing the variation in flow rate as a function of the stroke of the piston 13 during progressive closing is shown at 19a in FIGURE 2. In this figure it will be seen that the flow rate of heating fluid $Q_1$ supplying the heating radiator in the period between seasons corresponds to a position $x_1$ of the piston, and that to a small displacement $(\Delta x)_1$ of this piston, brought about by the thermostatic assembly reacting to a variation in temperature of the blown air, there will be a correspondingly very minor variation in flow rate which does not incur the risk of bringing about surge phenomena.

Various modifications may be made of the shape, the material and the dimensions o fthe diaphragm valve, as well as with the arrangement and the dimensions of the channels or analogous passages existing between the diaphragm valve and its seat when they are simply in contact, so as to give to the curve 19a in FIGURE 2 the configuration which will be most favourable to obtaining correct functioning of the regulation means.

In the embodiment in FIGURE 4, the upper portion of the valve, including the calibrating control means and the thermostatic assembly, is identical with the upper portion of the valve in FIGURE 3, and the same elements are denoted by the same reference numbers. The piston 13, however, instead of acting directly on the actuating bushing 12a, is linked by an articulation 28 to a cam 29 rotating about an axis 30, this cam bearing against a boss 31 of the actuating bushing 12a, which is maintained against this cam by the spring 27. The spring 25 in FIGURE 3, which keeps the block 21 bearing against the cam 23, is replaced by a helical spring or a torsion spring (not shown) which tends in a known manner to cause the cam 29 to rotate in a direction opposite to the movement of the hands of a watch (FIGURE 4). The bushing 12a acts on the valve 11' co-operating with its seat 10', the diaphragm valve 11' and the seat 10' being similar to the diaphragm valve 11 and the seat 10 of FIGURE 3. The seat 10' is simply annular and the diaphragm valve 11' is a simple valve with a diaphragm whose rim 11a' is at its periphery tightly squeezed between the valve body 7 and its hood 22.

In this embodiment, the piston 13 acts on the diaphragm valve 11' through the intervention of transmission means comprising the combination of the bushing 12a and of the spring 12b acting on the washer 12c, and the cam 29 which ensures the reduction. This reduction, which depends on the contour given to the cam 29, makes it possible to obtain the law of correspondence desired between the displacement $x$ of the piston 13 and the lifting of the diaphragm valve 11' when approaching complete shut-off. The contour of the cam 29 is selected so that, when in immediate proximity to complete shut-off, a considerable displacement $x$ of the piston 13 produces, through the agency of this cam, an insignificant displacement of the diaphragm valve 11' and, consequently, a very small variation in the flow rate Q.

The contour of the cam 29 may, for example, be so selected that the variation in this flow rate is represented by the curve 19b in FIGURE 2. To the flow rate $Q_1$ of the heating fluid in the period between seasons there will thus be a corresponding position $x''_1$ of the piston 13 constituting the actuating member, and it will be seen that a small displacement $(\Delta x)_1$ of this piston, brought about by the thermostatic assembly in response to a variation in the temperature of the blown air, will produce a very small variation in the flow rate.

When the opening of the valve is sufficient, the reduction between the piston 13 and the diaphragm valve 11' is not required and the contour of the cam 29 can be so determined that displacements in the diaphragm valve equal those of the piston.

What is claimed is:

1. An automatic valve device for use to control a fluid flow rate in a regulation system to provide a vernier-type action for adjusting the fluid flow rate when passing from the fully opened to fully closed position, comprising a valve body having an inlet port and an outlet port, two cooperating obturation members in the valve body having operative surfaces defining therebetween a passage leading from the inlet port to the outlet port and shallow channel means formed across the operative surface of at least one of the obturation members, at least one of said members being resiliently deformable and at least one of said members being movable from a fully opened position in which said operative surfaces are fully disengaged and substantially spaced from each other to a fully closed position in which said surfaces are tightly applied against each other to close the passage by deformation of said deformable member by progressively moving said deformable member into and filling said shallow channel; an actuating member movable along a predetermined travel by automatic control means and resiliently yieldable means operatively mounted between the actuating member and the movable obturation member to move the same positively from the fully opened position to said fully closed position, said obturation members, actuating member, control means, and resiliently yieldable means constructed and arranged to move said obturation members through, and capable of holding said obturation members in a plurality of intermediate positions in which the operative surfaces are seated against each other along portions thereof with said shallow channel means providing a reduced section area of the passage when going from the fully opened to the fully closed position, the actuating member thereby progressively moving through the agency of said resiliently yieldable means to seat said deformable obturation member in said shallow channel, thereby providing a continuous control of the flow rate of fluid passing from the inlet port to outlet port of said valve device.

2. An automatic valve device for use to control a fluid flow rate in a regulation system to provide a vernier-type action for adjusting the fluid flow rate when passing from the fully opened to fully closed position, comprising a valve body having an inlet port and an outlet port, two cooperating obturation members in the valve body having operative surfaces defining therebetween a passage leading from the inlet port to the outlet port and shallow channel means formed across the operative surface of at least one of the obturation members, at least one of said members being resiliently deformable and at least one of said members being movable from a fully opened position in which said operative surfaces are fully disengaged and substantially spaced from each other to a fully closed position in which said surfaces are tightly applied against each other to close the passage by deformation of said deformable member by progressively moving said deformable member into and filling said shallow channel; an actuating member movable along a predetermined travel by automatic control means including means presenting a variable inclined motion upon a follower and resiliently yieldable means operatively mounted between the actuating member and the movable obturation member to move the same positively from the fully opened position to said fully closed position, said obturation members, actuating member, control means, and resiliently yieldable means constructed and arranged to move said obturation members through, and capable of holding said obturation members in a plurality of intermediate positions in which the operative surfaces are seated against each other along portions thereof with said shallow channel means providing a reduced section area of the passage when going from the fully opened to the fully closed position, the actuating member thereby progressively moving through the agency of said resiliently yieldable means to seat said deformable obturation member in said shallow channel, thereby providing a continuous control of the flow rate of fluid passing from the inlet port to outlet port of said valve device.

3. Automatic valve device as claimed in claim 1, wherein the obturation members comprise a valve member made of elastic material and mounted for movement in the valve body, and an annular seat for the valve member, the shallow channel means comprising a crescent shaped indentation formed radially in the co-operating surface of the seat, and the indentation having a chord length comprised between about ⅓ and ⅕ of the circumference length of the annular seat and a depth comprised between ⅕ and ¹⁄₂₀ of the thickness of the valve member.

4. Automatic valve device as claimed in claim 1, comprising manually operable calibrating means for adjusting the travel of the actuating member.

5. Automatic valve devices as claimed in claim 1 comprising transmission means for transmitting the movement of the actuating member to the resiliently yieldable means at a transmission ratio which is variable along the travel, said ratio being smaller in the second portion of said travel than in the first portion thereof.

6. Automatic valve as claimed in claim 5 wherein the transmission means comprises a cam means constructed and arranged to transmit the movement of the actuating member at said variable transmission ratio.

(References on following page)

References Cited

UNITED STATES PATENTS

| | | | |
|---|---|---|---|
| 3,379,406 | 4/1968 | Greer | 251—333 |
| 2,106,300 | 1/1938 | Harrison | 137—625.3 |
| 3,152,785 | 10/1964 | Zeitlin | 251—251 X |
| 3,237,914 | 3/1966 | Alix | 251—333 X |
| 3,306,570 | 2/1967 | Cooksley | 251—251 X |
| 3,322,145 | 5/1967 | Prosser | 251—205 X |

FOREIGN PATENTS 980,896  1/1965  Great Britain.

WALTER A. SCHEEL, Primary Examiner

L. G. MACHLIN, Assistant Examiner

U.S. Cl. X.R.

251—58, 205, 263